United States Patent Office 3,252,922
Patented May 24, 1966

3,252,922
CELLULAR POLYURETHANE PLASTICS PREPARED FROM A BROMINE CONTAINING POLYETHER
Eberhart Degener, Leverkusen, Hans Holtschmidt, Cologne-Stammheim, and Gunther Braun, Cologne-Flittard, Germany, assignors to Farbenfabriken Bayer Aktiengesellschaft, Leverkusen, Germany, a German corporation
No Drawing. Filed Apr. 9, 1962, Ser. No. 185,842
Claims priority, application Germany, Apr. 27, 1961, F 33,785
8 Claims. (Cl. 260—2.5)

This invention relates to cellular polyurethane plastics and a method of preparing the same. More particularly, it relates to cellular polyurethane plastics having an improved flame resistance.

It has been heretofore known to produce cellular polyurethanes from polyhydroxyl compounds and polyisocyanates wherein tertiary amines are utilized as accelerators to produce a smooth formation of the basic substance.

It has also been heretofore known to use certain halogenated compounds in conjunction with the reactive components of a polyurethane plastic to improve the flame resistance thereof. These halogenated compounds improve the flame resistance to a certain degree, however they tend to give rigid foams.

It is an object of this invention to provide cellular polyurethanes having improved flame resistance. It is another object of this invention to provide a method of making cellular polyurethane plastics having an improved flame resistance. It is a further object of this invention to provide flame resistant cellular polyurethane plastics based on brominated polyethers. It is still another object of this invention to provide a method of making elastic cellular polyurethanes having improved flame resistance.

The foregoing objects and others which will become apparent from the following description are accomplished in accordance with this invention by providing cellular polyurethane plastics having improved flame resistance by reacting a polyalkylene ether having bromine chemically bonded to at least one carbon atom beta to an ether oxygen atom with an organic polyisocyanate and a blowing agent to produce a cellular product.

Bromine in this position with relation to an ether oxygen atom is highly reactive and therefore it would be expected normally that they would deactivate the tertiary amines present as accelerators either by alkylation or due to HBr being split off and thereby make the smooth production of cellular materials impossible. On the contrary, however, it has been found that these brominated ethers impart very good flame resistance to the resulting polyurethane materials which is even superior to the flame resistance imparted by the incorporation of polyhydroxy compounds having halogen atoms of low reactivity.

The brominated polyalkylene ethers may be used alone, however, it is preferred that they be used in conjunction with other organic compounds containing active hydrogen atoms which are reactive with —NCO groups. Any suitable organic compound containing active hydrogen atoms as determined by the Zerewitinoff method which atoms are reactive with an isocyanato group may be used such as, for example, hydroxyl and carboxyl terminated polyesters, polyhydric polyalkylene ethers, polyhydric thioethers, polyacetals, and the like.

Any suitable polyester may be used and may contain either terminal hydroxyl or terminal carboxyl groups depending upon the proportion of the polyhydric alcohol and polycarboxylic acid used in their preparation. The polyesters may also contain hetero atoms, double bonds, treble bonds, as well as saturated or unsaturated fatty acids or fatty alcohols as modifying components. Any suitable polyhydric alcohol may be used in making polyesters such as, for example, ethylene glycol, 1,3-propylene glycol, 1,3-butylene glycol, trimethylol propane, glycerine, pentaerythritol, N,N'-tetrakis (2-hydroxypropyl) ethylene diamine, 1,6-hexanediol, 1,5-amylene glycol, dihydroxyethyl hydroquinone, dihydroxyethyl-1,5-dihydroxy naphthalene and the like. Any suitable polycarboxylic acid may be used in making polyesters such as, for example, adipic acid, methyladipic acid, oxalic acid, glutaric acid, pimelic acid, succinic acid, sebacic acid, azelaic acid, suberic acid, phthalic acid, terephthalic acid, 1,2,4-benzene tricarboxylic acid, maleic acid, malonic acid, fumaric acid, oleic acid, ricinoleic acid, itaconic acid, citraconic acid, and mixtures thereof with difunctional monocarboxylic acids such as, for example, hydroxy stearic acid and the like. The term, polyester, of course, includes polyesteramides which are prepared by incorporating an amino compound into the reaction mixture for the preparation of polyesters. Any suitable amino compound may be used such as, for example, ethylene diamine, p-amino aniline, tolylene diamine, propylene diamine, ethanolamine, 3-amino propanol, amino butanol, 2-amino hexanol and the like. Any of the polyesters set forth in U.S. Patent 2,806,822 may be used as the organic compound containing active hydrogen atoms.

Any suitable polyhydric polyalkylene ether may be used such as, for example, the condensation product of alkylene oxides such as, for example, ethylene oxide, propylene oxide, butylene oxide, amylene oxide and the like or of such alkylene oxides with polyhydric alcohols such as, for example, ethylene glycol, 1,4-butanediol, trimethylol propane, glycerine, pentaerythritol and the like. Also certain aromatic oxides such as, for example, styrene oxide may be used if desired. The polyhydric polyalkylene ethers may also be prepared by the polymerization of cyclic ether such as, tetrahydrofuran in the presence of a Friedel-Crafts catalyst. The polyhydric polyalkylene ethers may be prepared by any suitable process such as the process disclosed in Wurtz in 1859 and in "Encyclopedia of Chemical Technology," volume 7, pages 247–262, published by Interscience Publishers, Inc., 1951, and in U.S. Patent 1,922,459.

Any suitable polyhydric polythioether may be used in the reaction with a polyisocyanate to prepare cellular polyurethane plastics of this invention such as, for example, the reaction product of one of the aforementioned alkylene oxides used in the preparation of the polyhydric polyalkylene ether with a thioether glycol such as, for example, the reaction product of one of the aforementioned alkylene oxides used in the preparation of the polyhydric polyalkylene ether with a thioether glycol such as, for example, thiodiglycol, 3,3'-di-hydroxy-propyl sulfide, 4,4'-dihydroxy butyl sulfide, 1,4-($\beta$-hydroxy ethyl) phenylene dithioether and the like.

Any suitable polyacetal may be used such as, for example, the reaction product of an aldehyde with a polyhydric alcohol. Any suitable aldehyde such as, for example, formaldehyde, paraldehyde, butyraldehyde and the like may be used. Any of the polyhydric alcohols mentioned above in the preparation of the polyester may be used to prepare polyacetals.

As stated previously, although the brominated polyalkylene ethers can be used alone, it is preferred that they be used in admixture with any of the aforementioned organic compounds containing active hydrogen. In order to achieve adequate flame protection, it is often sufficient to replace from about 5 to about 50% by weight of the organic compound containing active hydrogen atoms with the brominated polyalkylene ethers.

Any polyalkylene ether having bromine chemically bonded to at least one carbon atom beta to an ether oxygen atom may be used. The bromine containing ethers may be represented by the following formula:

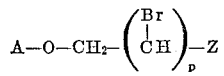

wherein A is the residue remaining after removing one hydroxyl group of a polyhydric alcohol and preferably is the structure

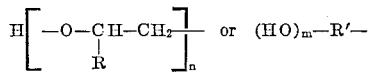

and Z is a hydrogen atom, alkyl, such as, for example, methyl, ethyl, propyl, butyl and the like, or a radical having the structural formula:

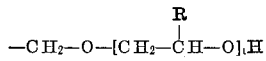

wherein R is hydrogen, alkyl, aryl, or cycloaliphatic; R' is aliphatic; $m$ is an integer of from 1 to 3; $n$ is an integer of from 1 to 10; $t$ is an integer of from 0 to 10 and $p$ is 1 or 2.

Thus, A in the formula above is preferably one of the two radicals set forth, however, it can be residue of any polyhydric alcohol including monomeric and polymeric polyhydric alcohols such as, for example, ethylene glycol, propylene glycol, butanediol, hexanetriol, trimethylolethane, trimethylol propane, pentaerythritol, hydroxyl polyesters, polyalkylene ethers, polythioethers, and polyacetals such as those set forth above, and the like. In a like manner, R' in the formula may be any of these residues remaining after removal of the hydroxyl group from a polyhydric alcohol.

R may be any alkyl, aryl or cycloaliphatic radical such as, for example, methyl, ethyl, propyl, butyl, phenyl, tolyl, cyclohexyl and the like. The radical containing R, of course, can be prepared by reacting a compound such as, for example, 2,3-di-bromo-butanediol with alkylene oxides such as, for example ethylene oxide, propylene oxide, butylene oxide, styrene oxide and the like.

Thus, the invention contemplates the use of a bromine containing ether having one of the following groupings:

—O—CH$_2$—CHBr—CHBr—R'—
                O—CH$_2$—(CHBr)$_p$—CH$_2$—O where R' represents hydrogen or an alkyl radical and $p$ is 1 or 2.

Specific examples of suitable brominated polyalkylene ethers in accordance with this invention are pentaerythritol-mono-2,3-dibromo-propylether, pentaerythritol-di-2,3-dibromo-polyethers, trimethylol propane-mono-2,3-dibromopropylether, mono-alkylated, di-oxalkylated or polyoxalkylated dibromo-butane-diols have the formula

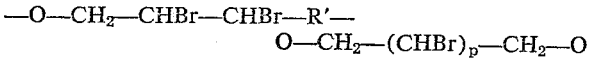
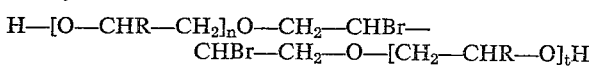

where R, $n$ and $t$ have the same meaning as set forth above.

Any suitable organic polyisocyanate may be used in reaction with the brominated polyalkylene ethers or a mixture of the brominated polyalkylene ethers with an organic compound containing active hydrogen atoms such as, for example, Ethylene diisocyanate,
Ethylidene diisocyanate,
Propylene diisocyanate,
Butylene diisocyanate,
Cyclopentylene-1,3-diisocyanate,
Cyclohexylene-1,4-diisocyanate,
Cyclohexylene-1,2-diisocyanate,
2,4-toluylene diisocyanate,
2,6-toluylene diisocyanate,
4,4'-diphenylmethane diisocyanate,
2,2-diphenylpropane-4,4'-diisocyanate,
p-phenylene diisocyanate,
m-phenylene diisocyanate,
Xylylene diisocyanate,
1,4-naphthylene diisocyanate,
1,5-naphthylene diisocyanate,
Diphenyl-4,4'-diisocyanate,
Azobenzene-4,4'-diisocyanate,
Diphenylsulfone-4,4'-diisocyanate,
Dichlorohexamethylene diisocyanate,
Tetramethylene diisocyanate,
Pentamethylene diisocyanate,
Hexamethylene diisocyanate,
1-chloro-benzene-2,4-diisocyanate,
Furfurylidene diisocyanate,
Benzene-1,3,5-triisocyanate,
Toluylene-2,4,6-triisocyanate,
4,4'-4''-triisocyanato triphenyl methane,
4,4',4'',4'''-tetraisocyanato-tetraphenylmethane
and the like.

Any suitable blowing agent can be used in the process of this invention such as, for example, water, haloalkanes such as, dichlorofluoromethane and the like.

The cellular polyurethane plastics prepared in accordance with this invention utilizing brominated polyalkylene ethers may also have incorporated in the reaction mixture catalysts, emulsifiers, stabilizers and other conventional auxiliary substances. Any suitable catalyst may be used such as, for example, tertiary amines including dimethyl benzyl amine, N-ethyl morpholine, N-methyl morpholine, tetramethyl-1,3-butane diamine, triethylene diamine, 1-methyl-4-dimethyl amino ethyl piperazine, 1-ethyl-4-diethyl amino ethyl piperazine, 1-butyl-4-dipropyl amino propyl piperazine, pyridine, diethyl ethanolamine, endoethylene piperazine; tin compounds including dibutyl tin dilaurate, dibutyl tin di(2-ethyl hexoate), stannous octoate, stannous oleate and the like. Any of the catalysts disclosed in an article entitled, "Catalysis of the Isocyanate-Hydroxyl Reaction," Journal of Applied Science, volume IV, Issue No. 11 may be used. Any suitable stabilizer may be used such as, for example, polysiloxane, polyalkylene glycol esters having the formula

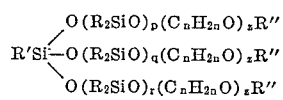

wherein R, R' and R'' are alkyl radicals having one to four carbon atoms; $p$, $q$ and $r$ are integers each having a value of from four to eight and $(C_nH_{2n}O)_z$ is a mixed polyoxymethylene oxypropylene group containing from 15 to 19 oxyethylene units and from 11 to 15 oxypropylene units with $z$ equal to from about 26 to about 34 is particularly advantageous. Organosilicons of this type and a method of making them are disclosed in U.S. Patent 2,834,748.

Although all silicone compounds represented by the general formula given above are contemplated for use in the method of this invention, the preferred organosilicon compounds have the formula:

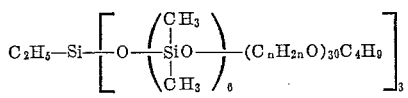

wherein $(C_nH_{2n}O)$ is a mixed polyoxymethylene and oxypropylene block copolymer containing about 17 oxyethylene units and 13 oxypropylene units.

Further, any suitable emulsifier may be used in the process of this invention if desired such as, for example, sulfonated castor oil, sulfonated methylol oils, amine esters of fatty acids such as prepared from oleic acid and diethylamine, ethylene oxide condensates of sorbitol esters of fatty acids, phenol and the like.

The procedure may be either accomplished by a one-step mixing operation wherein all of the reactants are individually introduced and mixed in a single operation or the procedure may be carried out step-wise wherein the isocyanate is first reacted with the active hydrogen containing compound or a mixture of such compounds and subsequently reacted in the presence of a blowing agent to prepare a cellular product.

The invention will be further illustrated by the following examples in which parts are given by weight unless otherwise specified.

*Example 1*

About 184 parts of polypropylene glycol having an hydroxyl number of 56 are thoroughly mixed with about 16 parts of 2,3-dibromobutanediol-1,4-mono-2-hydroxyethyl ether, about 0.8 part of endoethylene piperazine, about 0.2 part of dibutyl tin dilaurate, about 2 parts of polysiloxane polyalkylene glycol ester having the formula:

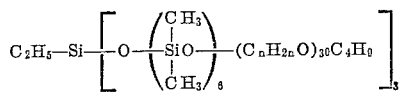

wherein $(C_nH_{2n}O)$ is a mixed polyoxymethylene and oxypropylene block copolymer containing about 17 oxyethylene units and 13 oxypropylene units, and about 5.4 parts of water. After adding about 82 parts of toluylene diisocyanate, the mixture is foamed.

A difficultly combustible elastic foam material is obtained with the following physical properties:

Weight per unit volume _____kg./m.$^3$__ 36
Tensile strength _____kg./cm.$^2$__ 1.4
Breaking elongation _____percent__ 225
Impact hardness (40% compression) ____g./cm.$^2$__ 44
Elasticity _____percent__ 33

*Example 2*

About 180 parts of polypropylene glycol having an hydroxyl number of about 56 are thoroughly mixed by stirring with about 20 parts of 2,3-dibromobutane-diol-1,4-mono-2-hydroxypropylether, about 0.6 part of the polysiloxane polyalkylene glycol ester of Example 1 and about 5.4 parts of water. After adding about 80 parts of toluylene diisocyanate, the mixture is introduced into a mold, in which a difficultly combustible soft foam material with the following mechanical values is formed:

Weight per unit volume _____kg./m.$^3$__ 36
Tensile strength _____kg./cm.$^2$__ 1.1
Breaking elongation _____percent__ 220
Impact hardness (40% compression) ____g./cm.$^2$__ 40
Elasticity _____percent__ 31

*Example 3*

About 180 parts of polypropylene glycol having the hydroxyl number of 56 are mixed with about 20 parts of the compound:

about 0.6 part of endoethylene piperazine, about 0.2 part of dibutyl tin dilaurate, about 2 parts of the polysiloxane polyalkylene glycol ester of Example 1 and about 5.4 parts of water. After about 79 parts of toluylene diisocyanate have been incorporated by stirring, a flame-resistant elastic soft foam material is obtained which has the following properties:

Weight per unit volume _____kg./m.$^3$__ 34
Tensile strength _____kg./cm.$^2$__ 1.1
Breaking elongation _____percent__ 280
Impact hardness (40% compression) ____g./cm.$^2$__ 38
Elasticity _____percent__ 34

*Example 4*

About 180 parts of polypropylene glycol having an hydroxyl number of 56 are thoroughly mixed with about 20 parts of 2,3-dibromobutanediol-1,4-di-2-hydroxyethylether, about 0.6 part of the polysiloxane polyalkylene glycol ester of Example 1 and 5.4 parts of water. After adding about 80 parts of toluylene diisocyanate, a difficultly combustible foam material is obtained which has the following physical properties:

Weight per unit volume _____kg./m.$^3$__ 37
Tensile strength _____kg./cm.$^2$__ 1.2
Breaking elongation _____percent__ 240
Impact hardness (40% compression) ____g./cm.$^2$__ 49
Elasticity _____percent__ 31

*Example 5*

About 190 parts of a polyester having an hydroxyl number of 60 prepared from adipic acid, diethylene glycol and trimethylol propane are thoroughly mixed by stirring with about 10 parts of a pentaerythritol-2,3-dibromopropylether mixture containing 54% of bromine, about 2 parts of dimethyl benzylamine, about 4 parts of an emulsifier prepared from oxyethylphenol and ethylene oxide, about 2 parts of sodium-castor oil sulphate (50% water) and about 2 parts of water. After adding about 72 parts of toluylene diisocyanate, the mixture starts to foam and a difficultly combustible soft foam with good supporting capacity is obtained, the said foam having the following mechanical properties:

Weight per unit volume _____kg./m.$^3$__ 45
Tensile strength _____kg./cm.$^2$__ 1.3
Breaking elongation _____percent__ 180
Impact hardness (40% compression) ____g./cm.$^2$__ 55
Elasticity _____percent__ 25

*Example 6*

About 180 parts of polypropylene glycol having an hydroxyl number of 56 are mixed with about 20 parts of trimethylol propane mono-2,3-dibromopropyl ether, about 0.6 part of endoethylene piperazine, about 0.2 part of dibutyltin dilaurate, about 2 parts of the polysiloxane polyalkylene glycol ester of Example 1 and about 5.4 parts of water. After incorporating about 82 parts of toluylene diisocyanate by stirring, the mixture is poured into a mold in which there is formed a flame-resistant soft foam material with the following properties:

Weight per unit volume _____kg./m.$^3$__ 35
Tensile strength _____kg./cm.$^2$__ 1.1
Breaking elongation _____percent__ 210
Impact hardness (40% compression) ____g./cm.$^2$__ 43
Elasticity _____percent__ 31

It is, of course, to be understood that any of the organic compounds containing active hydrogen atoms, brominated polyalkylene ethers, organic polyisocyanates, blowing agents, catalysts or other suitable auxiliary components of polyurethane foam formulations may be used throughout the working examples for those specifically used therein in order to prepare the cellular plastics in accordance with this invention.

Although the invention has been described in considerable detail in the foregoing for the purpose of illustration, it is to be understood that variations can be made by those skilled in the art without departing from the spirit of the invention and the scope of the claims.

What is claimed is:

1. A method of preparing cellular polyurethane plastics which comprises reacting in a reaction mixture containing a blowing agent, an organic polyisocyanate with an organic compound containing active hydrogen atoms which are reactive with —NCO groups, said compound being selected from the group consisting of hydroxyl polyesters, polyhydric polyalkylene ethers, polyhydric polythioethers and polyacetals, and an aliphatic polyalkylene ether having at least two alcoholic hydroxyl groups and having the formula

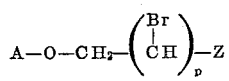

wherein A is the residue remaining after removing one hydroxyl group of a polyhydric alcohol, $p$ is an integer of from 1 to 2 and Z is a member selected from the group consisting of a hydrogen atom, an alkyl radical having 1 to 4 carbon atoms, and a radical having the formula $$-CH_2-O-[CH_2-\underset{|}{\overset{R}{C}}H-O]_tH$$

wherein R is selected from the group consisting of hydrogen, alkyl, aryl and cycloaliphatic and $t$ is an integer of from 0 to 10, with the proviso that when said radical A is the residue remaining after removing one hydroxyl group of a dihydric alcohol, said radical Z contains at least one hydroxyl group.

2. The cellular polyurethane plastic prepared by the process of claim 1.

3. A method of preparing cellular polyurethane plastics which comprises reacting in a reaction mixture containing a blowing agent, an organic polyisocyanate with an organic compound containing active hydrogen atoms which are reactive with —NCO groups, said compound being selected from the group consisting of hydroxyl polyesters, polyhydric polyalkylene ethers, polyhydric polythioethers and polyacetals, and an aliphatic polyalkylene ether having at least two alcoholic hydroxyl groups and having the formula

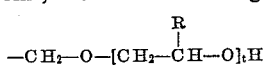

wherein A is the residue remaining after removing one hydroxyl group of a polyhydric alcohol, $p$ is an integer of from 1 to 2 and Z is a member selected from the group consisting of a hydrogen atom, an alkyl radical having 1 to 4 carbon atoms, and a radical having the formula $$-CH_2-O-[CH_2-\underset{|}{\overset{R}{C}}H-O]_tH$$

wherein R is selected from the group consisting of hydrogen, alkyl, aryl and cycloaliphatic and $t$ is an integer of from 0 to 10, with the proviso that when said radical A is the residue remaining after removing one hydroxyl group of a dihydric alcohol, said radical Z contains at least one hydroxyl group, said compound represented by the formula being present in an amount of from about 5 to about 50% based on the weight of the organic compound containing active hydrogen atoms.

4. A method of preparing cellular polyurethane plastics which comprises reacting in a reaction mixture containing a blowing agent, an organic polyisocyanate with an organic compound containing active hydrogen atoms which are reactive with —NCO groups, said compound being selected from the group consisting of hydroxyl polyesters, polyhydric polyalkylene ethers, polyhydric polythioethers and polyacetals, and a compound having the formula H-[O-CHR-CH$_2$]$_n$O-CH$_2$-CHBr-CHBr-CH$_2$-O-[CH$_2$-CHR-O]$_t$H wherein R is a member selected from the group consisting of alkyl, aryl and cycloaliphatic, $n$ is an integer of from 1 to 10 and $t$ is an integer from 0 to 10.

5. A method of preparing cellular polyurethane plastics which comprises reacting in a reaction mixture containing a blowing agent, an organic polyisocyanate with an organic compound containing active hydrogen atoms which are reactive with —NCO groups, said compound being selected from the group consisting of hydroxyl polyesters, polyhydric polyalkylene ethers, polyhydric polythioethers and polyacetals, and an aliphatic polyalkylene ether having at least two alcoholic hydroxyl groups and having the formula

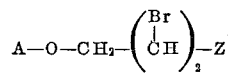

wherein A is the residue remaining after removing one hydroxyl group of a polyhydric alcohol, having from 2 to 4 alcoholic hydroxyl groups and Z is a member selected from the group consisting of a hydrogen atom, an alkyl radical having 1 to 4 carbon atoms and a radical having the formula

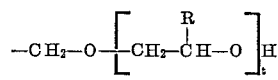

wherein R is selected from the group consisting of hydrogen, alkyl, aryl and cycloaliphatic and $t$ is an integer of from 0 to 10 with the proviso that when said radical A is the residue remaining after removing one hydroxyl group of a dihydric alcohol, said radical Z contains at least one hydroxyl group.

6. A method of preparing cellular polyurethane plastics which comprises reacting in a reaction mixture containing a blowing agent, an organic polyisocyanate with an organic compound containing active hydrogen atoms which are reactive with —NCO groups, said compound being selected from the group consisting of hydroxyl polyesters, polyhydric polyalkylene ethers, polyhydric polythioethers and polyacetals and an aliphatic polyalkylene ether having at least two alcoholic hydroxyl groups and having the formula

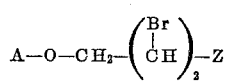

wherein A is the residue remaining after removing one hydroxyl group of a polyhydric alcohol and Z is —CH$_2$OH.

7. A method of preparing cellular polyurethane plastics which comprises reacting in a reaction mixture containing a blowing agent, an organic polyisocyanate with an organic compound containing active hydrogen atoms which are reactive with —NCO groups, said compound being selected from the group consisting of hydroxyl polyesters, polyhydric polyalkylene ethers, polyhydric polythioethers and polyacetals and an aliphatic polyalkylene ether having at least two alcoholic hydroxyl groups and having the formula

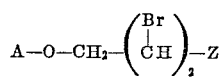

wherein A is the residue remaining after removing one hydroxyl group of a polyhydric alcohol and Z is a radical having the formula

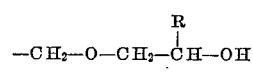

wherein R is a radical selected from the group consisting of hydrogen, alkyl, aryl and cycloaliphatic.

8. A method of preparing cellular polyurethane plastics which comprises reacting in a reaction mixture containing a blowing agent, an organic polyisocyanate with an organic compound containing active hydrogen atoms which are reactive with —NCO groups, said compound being selected from the group consisting of hydroxyl polyesters, polyhydric polyalkylene ethers, polyhydric polythioethers and polyacetals and an aliphatic polyalkylene ether having at least two alcoholic hydroxyl groups and having the formula

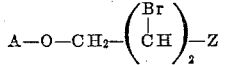

wherein A is the residue remaining after removing one hydroxyl group of a polyhydric alcohol and Z is a radical having the formula

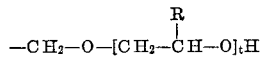

wherein R is selected from the group consisting of hydrogen, alkyl, aryl and cycloaliphatic and $t$ is 2.

References Cited by the Examiner

UNITED STATES PATENTS

| | | | |
|---|---|---|---|
| 2,780,350 | 2/1957 | Simon et al. | 260—2.5 |
| 3,076,784 | 2/1963 | Schulte-Huermann et al. | 260—2.5 |

LEON J. BERCOVITZ, *Primary Examiner.*

D. E. CZAJA, *Assistant Examiner.*